United States Patent [19]
Treffers

[11] Patent Number: 6,052,247
[45] Date of Patent: Apr. 18, 2000

[54] APPARATUS FOR AND METHOD OF RECORDING INFORMATION SIGNALS INTERMITTENTLY IN A FIRST PORTION OF A RECORD CARRIER AND CONTINUOUSLY IN A SECOND PORTION OF THE RECORD CARRIER

[75] Inventor: Menno A. Treffers, Eindhoven, Netherlands

[73] Assignee: U.S. Philips Corporation, New York, N.Y.

[21] Appl. No.: 09/046,040

[22] Filed: Mar. 23, 1998

[30] Foreign Application Priority Data

Apr. 3, 1997 [EP] European Pat. Off. .............. 97200978

[51] Int. Cl.[7] ................................ G11B 5/09; G11B 15/12
[52] U.S. Cl. ................................. 360/48; 360/63
[58] Field of Search ........................ 360/48, 63

[56] References Cited

U.S. PATENT DOCUMENTS

| | | | |
|---|---|---|---|
| 5,432,769 | 7/1995 | Honjo | 369/60 |
| 5,572,378 | 11/1996 | Schwarz et al. | 360/48 |
| 5,592,342 | 1/1997 | Hall et al. | 360/48 |
| 5,684,657 | 11/1997 | Willems Van Dijk | 360/109 |
| 5,721,647 | 2/1998 | Lokhoff | 360/822 |
| 5,805,372 | 9/1998 | Hoogendoorn et al. | 360/77.01 |
| 5,912,637 | 6/1999 | Hoogendoorn et al. | 341/58 |

*Primary Examiner*—W. Chris Kim
*Attorney, Agent, or Firm*—Edward W. Goodman

[57] ABSTRACT

An apparatus for recording information signals in a track ($T_i$) on a record carrier (2) is disclosed, comprising an input terminal (30) for receiving an information signal, a signal processing unit (32) for processing the information signal so as to make the information signal suitable for recording in at least one track on said record carrier, and a writing unit (33) for writing, after processing, the information signal in said at least one track on said record carrier, starting from a start position (s) viewed in the length direction of the record carrier and in a direction towards one of the end positions of the record carrier.

The portion of the record carrier (2) between said start position (s) and said one end position ($L_2$) is fictitiously divided into a first sub portion lying ($P_1$) adjacent the start position and a second sub portion ($P_2$) lying adjacent the end position of the record carrier. When recording a first information signal, a first portion of a first information signal is recorded by intermittently recording blocks of information ($B_{1,1}$, $B_{1,2}$, $B_{1,3}$, . . . ) in said track ($T_1$) in said first subportion ($P_1$) of the record carrier, starting from said start position (s). A second portion of the said first information signal is continuously recorded in said second subportion of the record carrier.

11 Claims, 3 Drawing Sheets

APPARATUS FOR AND METHOD OF RECORDING INFORMATION SIGNALS INTERMITTENTLY IN A FIRST PORTION OF A RECORD CARRIER AND CONTINUOUSLY IN A SECOND PORTION OF THE RECORD CARRIER

BACKGROUND OF THE INVENTION

1. Field of The Invention

The invention relates to an apparatus for recording information signals in a track on a longitudinal record carrier, comprising:

input means for receiving an information signal;

processing means for processing the information signal so as to make the information signal suitable for recording in at least one track on said record carrier; and writing means for writing, after processing, the information signal in said at least one track on said record carrier, starting from a start position viewed in the length direction of the record carrier and in a direction towards one of the end positions of the record carrier.

The invention also relates to a method of recording the information signals on said record carrier, and to a record carrier.

2. Description of The Related Art

An apparatus as defined in the opening paragraph is known from International Patent Application WO 96/18,188 A2, corresponding to U.S. Pat. No. 5,721,647, Document D1 in the List of Related Documents, that can be found at the end of this description. The known apparatus records a plurality of information signals in an interleaved way in a plurality of tracks on the record carrier.

SUMMARY OF THE INVENTION

The invention aims at providing an improved recording apparatus for recording a plurality of information signals. The apparatus in accordance with the invention is characterized in that the portion of the record carrier between said start position and said one end position is fictitiously divided into a first sub-portion lying adjacent the start position and a second sub-portion lying adjacent the end position of the record carrier, and that the apparatus is adapted to record a first portion of a first information signal as blocks of information intermittently in said at least one track in said first sub-portion of the record carrier, starting from said start position, and to record a second portion of the said first information signal continuously in said second sub-portion of the record carrier.

The invention is based on the following recognition. In order to decrease the access time to various information signals recorded on a record carrier, it is well known to start the recording of the information signals from one location, the so-called start position on the record carrier. This is, among others, described in unpublished European Patent Application No. 96202074.9, Document D2 in the List of Related Documents. The number of information signals that can be recorded from this start position is thus limited and related to the number of tracks on the record carrier. In accordance with the invention, the number of information signals that can be recorded and retrieved, starting from the start position, can be increased by an interleaved recording of the information signals. Further, information signals of relatively long lengths and relatively short lengths may be recorded on the record carrier. Therefore, the portion of the record carrier between the start position and one end position is fictitiously divided into a first and a second sub-portion. Interleaved recorded is realized in the first sub-portion, which is sufficiently long that relatively short information signals can be recorded in their entirety in the first sub-portion. Longer information signals, that are of such a length that they need to be recorded in the second sub-portion as well, will be recorded in this sub-portion in a continuous way, so as to improve "storage utilization", and thereby "save storage space" on the record carrier.

BRIEF DESCRIPTION OF THE DRAWINGS

These and other aspects of the invention will be apparent from and elucidated with respect to the embodiments described hereafter in the accompanying drawings, in which.

DESCRIPTION OF THE PREFERRED EMBODIMENTS

Figure 1:
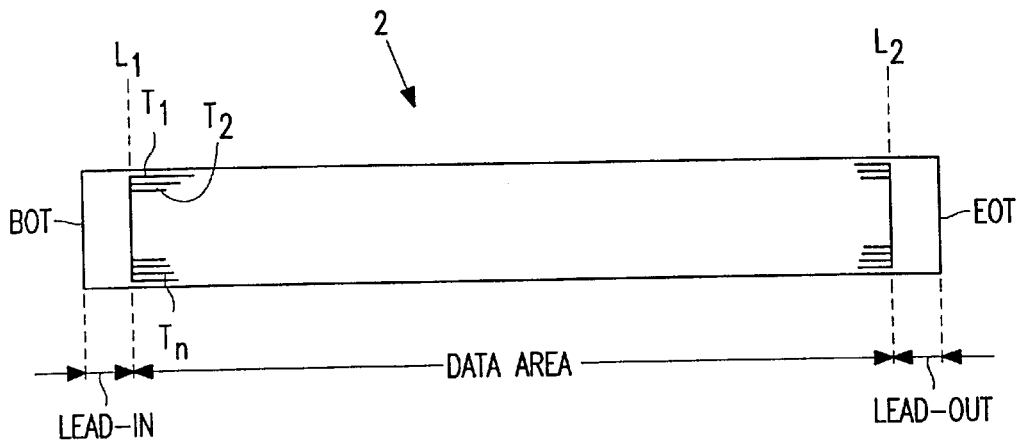
FIG. 1 shows, schematically, the record carrier.

FIG. 1 shows the record carrier 2, schematically, over its total length. The start end of the record carrier 2 is indicated by BOT (beginning-of-tape) and the final end is indicated by EOT (end-of-tape). A lead-in portion and a lead-out portion are shown, being the portions between the start end (BOT) of the record carrier and the line $L_1$, and between the final end (EOT) of the record carrier and the line $L_2$, respectively. A data area for recording the information signal is available between the lead-in portion and the lead-out portion of the record carrier 2.

Tracking signals may be recorded in the record carrier in order to enable recording of the information so as to obtain information tracks $T_1$ to $T_n$, as shown in FIG. 1. Reference is made to the Documents D3 to D7 in the List of Related Documents, which further describe the tracking signals and the use of such tracking signals. Where necessary, these documents are assumed to be incorporated by reference in the present application.

Figure 2:
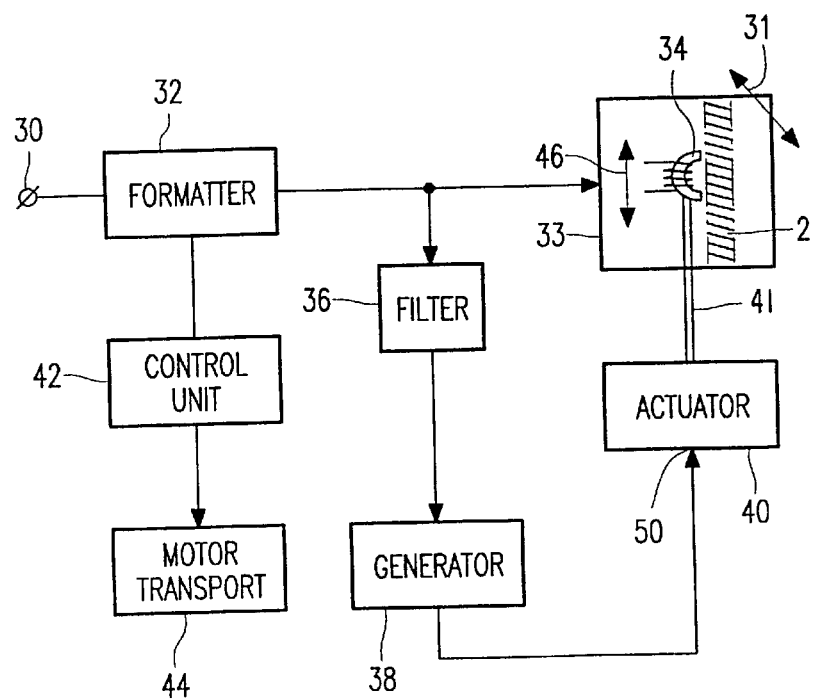
FIG. 2 shows an apparatus in accordance with the invention.
Figure 3:
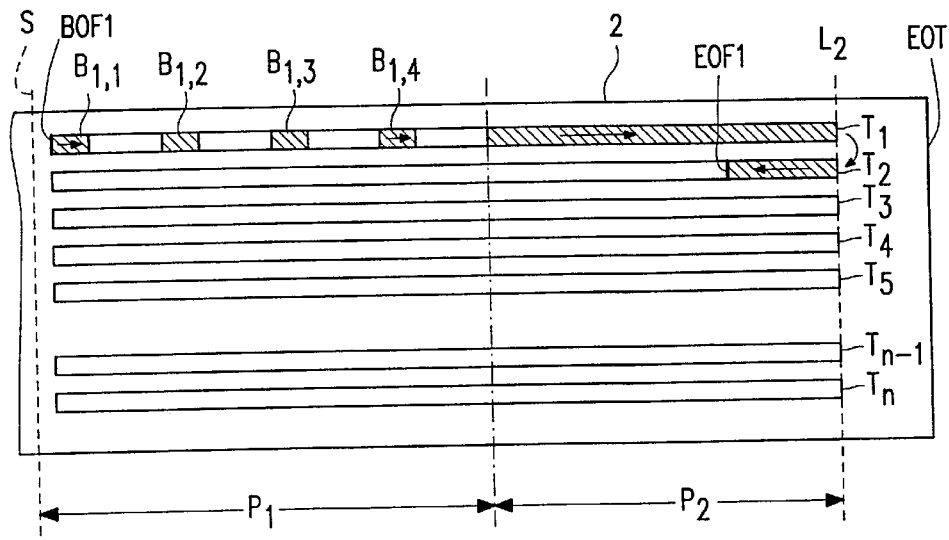
FIG. 3 shows the record carrier obtained with the apparatus of FIG. 2 having a first information signal recorded thereon.

FIG. 2 shows an embodiment of an apparatus for recording an information signal on the record carrier 2 of FIG. 1, which has tracking signals pre-recorded on it. FIG. 3 shows how the information signal is recorded on the record carrier 2. The apparatus of FIG. 2 has an input terminal 30 for receiving the information signal. The input terminal is coupled to an input of a formatter unit 32, which converts the information signal into a format suitable for recording on the record carrier 2. An output of the formatter unit 32 is coupled to a write unit 33 comprising a write/read head 34. The formatted information signal is supplied to the write/read head 34 and recorded in one of the tracks $T_1, T_2, \ldots, T_n$ on the record carrier 1. The record carrier, as shown in FIG. 2, is transported in directions indicated by the arrow 31.

The head 34 is further adapted to read tracking signals recorded in the record carrier. The tracking signals are supplied to a filter unit 36, which has a band-pass filter characteristic with a center frequency equal to the specific frequency of the tracking signals. As the frequency of the tracking signals is low relative to the frequency content of the formatted information signal, it is possible to read the tracking signals from the record carrier, while writing the formatted information signal into the track $T_1$.

A generator unit 38 is present for generating a control signal in response to the tracking signals read by the head 34. This control signal is supplied to an input 50 of an actuator unit 40. The actuator unit 40 actuates a movable mounting 41 on which the head 34 is mounted. The movable mounting can have any form. One preferred embodiment of a mounting is described in European Patent Application No. 95202926.2, corresponding to U.S. Pat. No. 5,684,657, Document D3 in the List of Related Documents. Further, the functioning of the tracking servo mechanism is extensively described in Document D6 in the List of Related Documents.

A control unit 42 is present for controlling a motor transport unit 44. By controlling the motor transport unit, the record carrier 2 is transported in one of the two directions shown by the arrow 31.

FIG. 3 shows an example of the record carrier after having an information signal, such as a movie, recorded thereon. The width of the record carrier is largely exaggerated in order to better illustrate the record carrier and to explain the functioning of the apparatus. Tracks $T_1$ to $T_n$ are shown in this example.

As can be seen, the total length of the record carrier between the start location, which is the line s, and the end of the record carrier, which is the line L2, is divided into a first sub-portion, denoted $P_1$, and a second sub-portion, denoted $P_2$. The sub-portions may be of equal or different lengths.

When recording a movie on the record carrier, recording starts in track $T_1$, at the start location indicated by the line s.

It should be noted here, that the start location may be at the beginning of the record carrier, which generally will be preceded by a small area for recording a Table Of Contents. In this situation, information signals are always recorded starting from left and going to the right in FIG. 3. When the end of a track is reached, recording continues in another track, by changing the direction of transport of the record carrier and recording the information signal from the right and going to the left in FIG. 3.

The start position need not be at the beginning of the record carrier and may, as an example, be located midway the total length of the record carrier. In such situation, information signals are recorded in the first half of the record carrier, by starting recording at the start position and proceeding in the direction of the beginning of the record carrier, or in the second half of the record carrier, by starting recording at the start position and proceeding in the direction of the end of the record carrier. A Table Of Contents will then be located midway in the record carrier, between the first half and the second half in which information signals are recorded.

The result of the recording of a first information signal on the record carrier 2 is shown in FIG. 3. The direction of recording is indicated by the arrows in FIG. 3. Prior to starting recording, the write head 34 is, or is positioned, in the start position s. Next, recording of the information signal in track $T_1$ is started. In a first recording mode, the formatter unit 32 generates blocks of data of the information signal. These blocks of data, denoted $B_{1,1}$, $B_{1,2}$, $B_{1,3}$, $B_{1,4}$, are intermittently recorded in the track $T_1$, as far as located in the first sub-portion P1. The first block generated comprises a "begin-of-file" word BOF. As the total first information signal to be recorded is longer than the amount of information that can be recorded in the blocks $B_{1,1}$ to $B_{1,4}$, the apparatus is switched into a second recording mode upon reaching the boundary between the first and the second sub-portions, $P_1$ and $P_2$, respectively. In the second recording mode, the apparatus continuously records the remaining portion of the first information signal in the second sub-portion $P_2$, by continuously recording the first information signal in the first track $T_1$. Upon reaching the end of the record carrier 2, the direction of transport of the record carrier is reversed and the write head is positioned on the track $T_2$. The continuous recording mode is continued by recording the remaining portion of the first information signal in the second track, until recording is terminated by generating an "end-of-file" word EOF1.

It should be noted here that, if the first information signal is of such a length that recording in the second track $T_2$ has not yet terminated when again reaching the boundary between the first and second sub-portions $P_1$ and $P_2$, respectively, recording is continued, preferably by reversing the direction of transport of the record carrier 2 and positioning the write head 34 on the track $T_3$. In another embodiment, recording could be continued in the portion of the second track $T_2$, located in the first sub-portion $P_1$.

It should further be noted that the use and recording of BOF and EOF words is not strictly necessary. It may be possible to identify the beginning position and the end position of an information signal recorded, by, e.g., the (sync) block numbers of the first and last block of the information signal recorded.

The distance between two subsequent data blocks recorded can be bridged either at the nominal recording transport speed of the record carrier, or at an increased transport speed.

Suppose an information signal, having a bit-rate of p (which equals, e.g., 4) Mbit/s, should be recorded on the record carrier, while the bit-rate of the "transmission channel", i.e., the recording medium, is q (which equals, e.g., 12) Mbit/s. Blocks of information of the information signal can now be buffered in a buffer (not shown) at the rate of p Mbit/s and read out from the buffer at the rate of q Mbit/s, realizing a time compression of q/p (which equals 3 in the present example). The time compressed blocks are now recorded in the track on the record carrier. When maintaining the record carrier speed during the time intervals in which no time compressed blocks are written on the record carrier, the distance between the time compressed blocks recorded in the track is q/p−1 times the length of the time compressed blocks recorded on the record carrier. Thus, in the present example, two other information signals of 4 Mbit/s, or one other information signal of 8 Mbit/s, can be recorded in an interleaved way in the first sub-portion, as will be explained hereafter.

Figure 4:
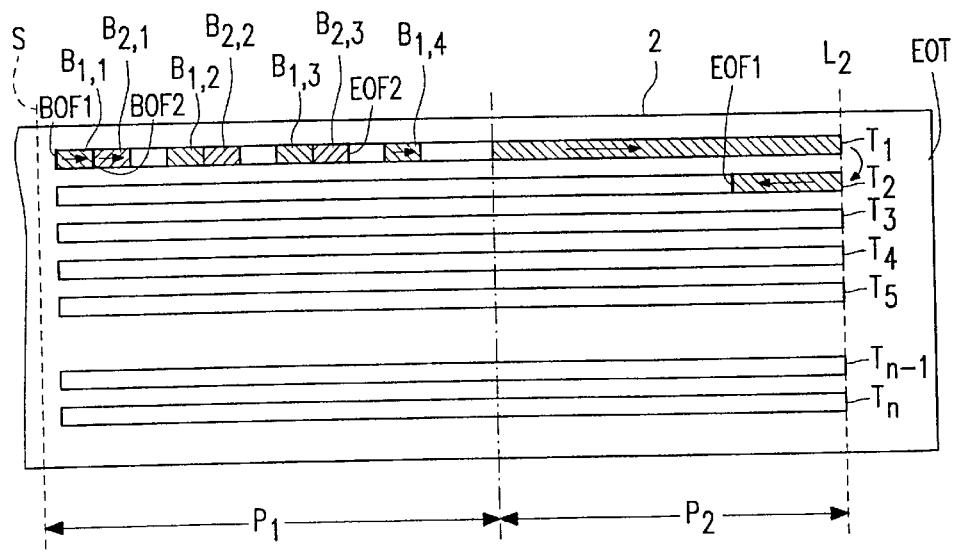
FIG. 4 shows the record carrier of FIG. 3 having a second information signal recorded thereon.

Next, a second information signal is to be recorded on the record carrier 2. This is shown in FIG. 4. Prior to starting recording, the write head 34 is, or is positioned, in the start position s. Next, recording of the second information signal in track $T_1$ is started. In the first recording mode, the formatter unit 32 generates blocks of data of the second information signal. These blocks of data, denoted $B_{2,1}$, $B_{2,2}$, $B_{2,3}$ are intermittently recorded the track $T_1$, as far as located in the first sub-portion $P_1$. The first block $B_{2,1}$ again comprises the "begin-of-file" word BOF2. The blocks are recorded in the empty portions between the blocks $B_{1,1}$, $B_{1,2}$, $B_{1,3}$, $B_{1,4}$ of the first information signal. As there is no more information of the second information signal than the information already stored in the blocks $B_{2,1}$, $B_{2,2}$, $B_{2,3}$, recording is terminated. Thus, the block $B_{2,3}$ comprises the "end-of-file" word, denoted EOF2.

Figure 5:
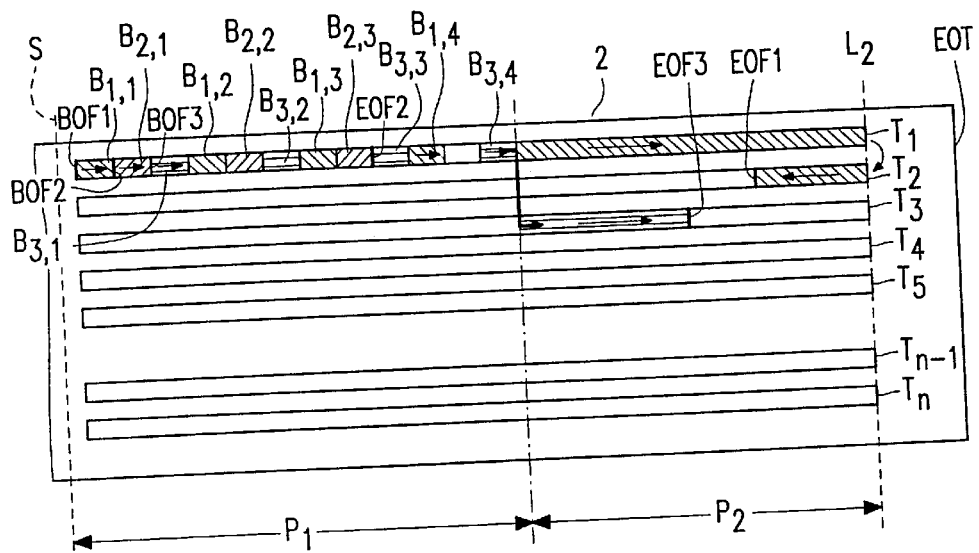
FIG. 5 shows the record carrier of FIG. 4 having a third information signal recorded thereon.

Next, a third information signal is to be recorded on the record carrier 2. This is shown in FIG. 5. Prior to starting recording, the write head 34 is, or is positioned, in the start position s. Next, recording of the third information signal in track $T_1$ is started. In the first recording mode, the formatter unit 32 generates blocks of data of the third information signal. These blocks of data, denoted $B_{3,1}$, $B_{3,2}$, $B_{3,3}$, $B_{3,4}$, are intermittently recorded the track $T_1$, as far as located in the first sub-portion $P_1$. The first block $B_{3,1}$ again comprises the "begin-of-file" word, denoted BOF3. The blocks are recorded in the empty portions between the blocks of the first and second information signals already recorded in the track $T_1$. As the total third information signal to be recorded is longer than the amount of information that can be recorded in the blocks $B_{3,1}$ to $B_{3,4}$, the apparatus is switched into a second recording mode upon reaching the boundary between the first and the second sub-portions $P_1$ and $P_2$, respectively. In the second recording mode, the apparatus continuously records the remaining portion of the third information signal in the second sub-portion $P_2$.

The remaining portion of the third information signal cannot be recorded in the track $T_1$, as the track $T_1$ is already occupied by the recorded first information signal. Therefore, the write head 34 is positioned on an empty track, such as the track $T_3$, and the remaining portion of the third information signal is continuously recorded in the third track $T_3$. Recording is terminated by generating an "end-of-file" word EOF3.

Figure 6:
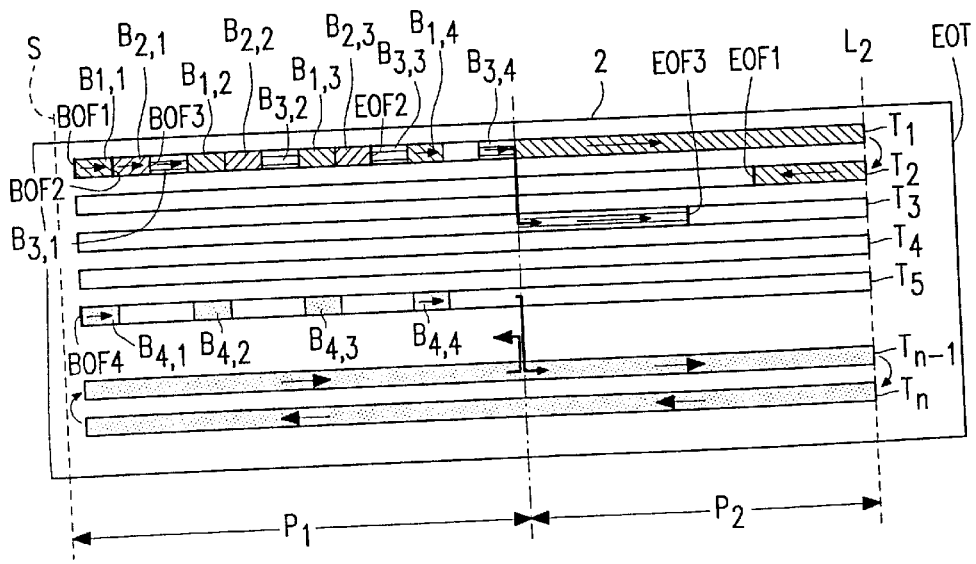
FIG. 6 shows the record carrier of FIG. 5 having a fourth information signal recorded thereon.

Next, a fourth information signal is to be recorded on the record carrier 2. This is shown in FIG. 6. Prior to starting recording, the write head 34 is, or is positioned, in the start position s. Next, recording of the fourth information signal is started. It is assumed that recording is started in the track $T_5$, as shown in FIG. 6. In the first recording mode, the formatter unit 32 generates blocks of data of the fourth information signal. These blocks of data, denoted $B_{4,1}$, $B_{4,2}$, $B_{4,3}$, $B_{4,4}$, are intermittently recorded the track $T_5$, as far as located in the first sub-portion $P_1$. The first block $B_{4,1}$ again comprises a "begin-of-file" word, denoted BOF4. As the total fourth information signal to be recorded is longer than the amount of information that can be recorded in the blocks $B_{4,1}$ to $B_{4,4}$, the apparatus is switched into a second recording mode upon reaching the boundary between the first and the second sub-portions $P_1$ and $P_2$, respectively. In the second recording mode, the apparatus continuously records the remaining portion of the fourth information signal in the second sub-portion $P_2$.

It is assumed that the remaining portion of the fourth information signal cannot be recorded in any of the tracks $T_1$ to $T_{n-2}$. Therefore, the write head 34 is positioned on an empty track, which is the track $T_{n-1}$, and recording of the fourth information signal is continued by continuously recording the fourth information signal in the track $T_{n-1}$. Upon reaching the end of the record carrier 2, the direction of transport of the record carrier is reversed and the write head is positioned on the track $T_n$. The continuous recording mode is continued by recording the fourth information signal in the track $T_n$, until reaching the boundary between the first and the second sub-portions. Recording of the fourth information signal is now continued by continuously recording the information signal in the portion of the track $T_n$ located in the first sub-portion of the record carrier, without changing the transport direction of the record carrier.

Upon reaching the start location s, recording is continued by positioning the write head 34 on the track $T_{n-1}$ and reversing the direction of transport of the record carrier, so that the fourth information signal can be recorded in the portion of the track Tn−1 located in the first sub-portion $P_1$ of the record carrier 2. Upon again reaching the start location s, recording can be continued by positioning the write head 34 on the track $T_{n-2}$ and reversing the direction of transport of the record carrier again, so that the remaining portion of the fourth information signal can be recorded in the portion of the track $T_{n-2}$ located in the first sub-portion $P_1$ of the record carrier 2.

It should be noted here, that the distance between successive blocks of information of one and the same information signal in a track is such that, upon reproduction, a continuous datastream can be regenerated.

While the invention has been described with reference to preferred embodiments thereof, it is to be understood that these are not limitative examples. Thus, various modifications may become apparent to those skilled in the art, without departing from the scope of the invention, as defined by the claims. Thus, although the invention has been described with reference to the recording of an information signal in one track, it may be clear that the recording in a plurality of tracks is equally well within the scope of the present invention. Further, in the above description, it has been explained how information signals can be recorded in a portion of the record carrier located between the start position s and the end of the record carrier. It will be clear that by mirror imaging the concept described, information signals can be recorded between said start position and the beginning of the record carrier, namely, in the situation where the start location is somewhere midway the total length of the record carrier, such as is well known in the art, see International Patent Application WO 95/34,892 A1, corresponding to U.S. Pat. No. 5,572,378, Document D8 in the List of Related Documents.

The blocks recorded in the first sub-portion need not all have the same length. Further, the location of the boundary between the first and second sub-portions can be appropriately chosen.

Further, the invention lies in each and every novel feature or combination of features.

In accordance with the invention, a record carrier can be obtained with a short access time to an increased number of recorded information signals. In the example described above, when a read head for reading information from a track, such as the track $T_1$, is located at the start position s, it can more or less instantaneously access three information signals from the track $T_1$ for reproduction. Further, the invention results in an improved utilization of the storage capacity on the record carrier.

LIST OF RELATED DOCUMENTS (D1) International Patent Application WO 96/18,188 A2, corresponding to U.S. Pat. No. 5,721,647 (PHN 15.140).
(D2) European Patent Appln. No. 96202074.9, filed Jul. 22, 1996, corresponding to U.S. patent application Ser. No. 08/914,052, filed Jul. 15, 1997 (PHN 15,902).
(D3) European Patent Appln. No. 95202926.2, filed Oct. 30, 1995, corresponding to U.S. Pat. No. 5,684,657 (PHN 15,520).
(D4) European Patent Appln. No. 95203028.6, filed Nov. 8, 1995, corresponding to U.S. application Ser. No. 08/744, 802, filed Nov. 6, 1996 (PHN 15.543).
(D5) European Patent Appln. No. 95203029.4, filed Nov. 8, 1995, corresponding to U.S. Pat. No. 5,912,637 (PHN 15.545).

(D6) European Patent Appln. No. 95203192.0, filed Nov. 21, 1995, corresponding to U.S. patent application Ser. No. 08/744,798, filed Nov. 6, 1996 (PHN 15.563).

(D7) European Patent Appln. No. 95203380.1, filed Dec. 7, 1995, corresponding to U.S. Pat. No. 5,805,372 (PHN 15.594).

(D8) International Patent Appln. WO 95/34,892 A1, corresponding to U.S. Pat. No. 5,572,378.

What is claimed is:

1. An apparatus for recording information signals in a track on a record carrier, comprising:

input means for receiving an information signal;

processing means for processing the information signal, said processing means making the information signal suitable for recording in at least one track on said record carrier; and writing means for writing, after processing, the information signal in said at least one track on said record carrier, wherein said record carrier is a longitudinal record carrier having two end positions, and said writing means starts writing on a portion of said record carrier from a start position viewed in length direction of the record carrier, and proceeding in a direction towards one of the end positions of the record carrier, characterized in that the portion of the record carrier between said start position and said one end position is divided into a first sub-portion lying adjacent the start position and a second sub portion lying adjacent said one end position of the record carrier, wherein said processing means forms a first portion of a first information signal as blocks of information, and said writing means writes said blocks of information intermittently in said at least one track in said first sub-portion of the record carrier, starting from said start position, and said processing means forms a second portion of said first information signal as a continuous signal, and said writing means writes said second portion continuously in said second sub-portion of the record carrier.

2. The apparatus as claimed in claim 1, characterized in that the processing means forms at least a first portion of a second information signal as blocks of information, and said writing means writes said blocks of information intermittently in said at least one track in said first sub-portion of the record carrier, in between the blocks of information of the first information signal, starting from said start position.

3. The apparatus as claimed in claim 2, characterized in that the processing means forms the second information signal entirely as blocks of information, and the writing means writes all of the blocks of information intermittently in said at least one track in said first sub-portion of the record carrier, in between the blocks of information of the first information signal, starting from said start position.

4. The apparatus as claimed in claim 1, characterized in that the processing means forms at least a first portion of a second information signal as blocks of information, and the writing means writes the blocks of information intermittently in said at least one track in said first sub-portion of the record carrier, in between the blocks of information of the first information signal, starting from said start position, and said processing means forms a second portion of the said second information signal as a continuous signal, and said writing means writes said second portion continuously in at least one other track in said second sub-portion of the record carrier.

5. The apparatus as claimed in claim 1, characterized in that the writing means writes said second portion of the first information signal continuously in one or more of the tracks in said second sub-portion of the record carrier, in a direction towards said one end position of the record carrier, and continues writing said second portion of the said first information signal continuously in one or more other tracks in said second sub-portion of the record carrier, in a direction towards the start position.

6. The apparatus as claimed in claim 5, characterized in that the writing means continues writing said second portion of the first information signal continuously in said one or more other tracks in said first sub-portion of the record carrier, in the direction towards the start position.

7. The apparatus as claimed in claim 6, characterized in that the writing means continues writing said second portion of the first information signal continuously in one or more of further tracks in said first sub-portion of the record carrier, in the direction towards said one end position of the record carrier.

8. The apparatus as claimed in claim 7, characterized in that the writing means continues writing said second portion of the first information signal continuously in one or more of once again other tracks in said first sub-portion of the record carrier in the direction towards the start position.

9. The apparatus as claimed in claim 5, characterized in that the writing means continues writing said second portion of the first information signal continuously in one or more of again other tracks in said second sub-portion of the record carrier, in the direction towards the one end position of the record carrier.

10. A method of recording information signals in a track on a record carrier, comprising the steps:

receiving an information signal;

processing the information signal to make the information signal suitable for recording in at least one track on said record carrier; and writing, after processing, the information signal in said at least one track on said record carrier, starting from a start position viewed in the length direction of the record carrier and in a direction towards one of the end positions of the record carrier, characterized in that the portion of the record carrier between said start position and said one end position is divided into a first sub-portion lying adjacent the start position and a second sub-portion lying adjacent the end position of the record carrier, and that the processing step comprises forming a first portion of a first information signal as blocks of information, and said writing step comprises writing said blocks of information intermittently in said at least one track in said first sub-portion of the record carrier, starting from said start position, and said processing step further comprises forming a second portion of said first information signal as a continuous signal, and said writing step further comprises writing said second portion continuously in said second sub-portion of the record carrier.

11. A record carrier having an information signal recorded thereon in a track on the record carrier, a portion of the record carrier between a start position and one end position of the record carrier being divided into a first sub-portion lying adjacent the start position and a second sub-portion lying adjacent the end position of the record carrier, a first portion of the information signal being intermittently recorded as blocks of information in said first sub-portion of the record carrier, starting from said start position, and a second portion of the information signal being continuously recorded in said second sub-portion of the record carrier.

* * * * *